(12) United States Patent
Shih

(10) Patent No.: US 6,400,851 B1
(45) Date of Patent: Jun. 4, 2002

(54) ROTATING IMAGE DATA

(75) Inventor: Yung-Ho Shih, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/191,751

(22) Filed: Jan. 28, 1999

(51) Int. Cl.$^7$ ................................................ G06K 9/32
(52) U.S. Cl. ....................... 382/297; 382/298; 382/296; 345/659; 345/648; 348/583
(58) Field of Search ................................. 382/297, 296, 382/299, 289, 177, 282, 283, 290; 345/648, 659, 660, 671; 348/583

(56) References Cited

U.S. PATENT DOCUMENTS

| | | | | |
|---|---|---|---|---|
| 4,799,173 A | * | 1/1989 | Rose et al. | 364/518 |
| 5,379,127 A | * | 1/1995 | Ando | 358/448 |
| 5,517,587 A | * | 5/1996 | Baker et al. | 382/296 |
| 5,598,181 A | * | 1/1997 | Kermisch | 345/126 |
| 5,670,982 A | * | 9/1997 | Zhao | 345/126 |
| 5,734,875 A | * | 3/1998 | Cheng | 395/516 |
| 5,912,995 A | * | 6/1999 | He | 382/297 |
| 5,973,661 A | * | 10/1999 | Kobayashi et al. | 345/100 |
| 6,055,326 A | * | 4/2000 | Chang et al. | 382/132 |

FOREIGN PATENT DOCUMENTS

| | | | |
|---|---|---|---|
| EP | 0216501 | 4/1987 | G06F/15/62 |
| EP | 0677822 | 10/1995 | G06T/3/60 |
| EP | 0744711 | 11/1996 | G06T/3/60 |

OTHER PUBLICATIONS

International Search Report—PCT/US 99/ 26466, 4 pages, (Feb. 7, 2000).

"Method for Rotating an 8×8 bit Image", *IBM Technical Disclosure Bulletin*, 27(8), XP002128057, pp. 1–2, (Jan. 1985).

"Shift Register System for Image Orientation", *IBM Technical Disclosure Bulletin*, 18(8), XP002128058, pp. 1–6, (Jan. 1976).

* cited by examiner

*Primary Examiner*—Bhavesh Mehta
*Assistant Examiner*—Yosef Kassa
(74) *Attorney, Agent, or Firm*—Lee & Hayes, PLLC

(57) ABSTRACT

Rotating image data ninety degrees is disclosed. In one embodiment of the invention, the computerized system includes an operating system providing a graphics interface library, and a graphics interface buffer maintained by the graphics interface library. The graphics interface buffer contains image data comprising a first screen image. The system also includes a graphics device driver that implements a method to rotate an area within the image data by dividing the area into a plurality of square pixel regions, rotating each of the squares, and writing the squares to an image data buffer comprising a display buffer maintained by the graphics device driver.

16 Claims, 6 Drawing Sheets

| M | N | P | R |
|---|---|---|---|
| I | J | K | L |
| E | F | G | H |
| A | B | C | D |

*Fig. 5*

| A | E | I | M |
|---|---|---|---|
| B | F | J | N |
| C | G | K | P |
| D | H | L | R |

*Fig. 6*

ROTATING IMAGE DATA

FIELD OF THE INVENTION

This invention relates generally to software for displaying image data, and more specifically to rotating image data.

BACKGROUND OF THE INVENTION

The rapid evolution of personal computer technology continues to produce personal computers that are smaller, cheaper and faster than their predecessors. Where computers once occupied entire rooms, they are now small enough to fit in the palm of the hand, hence the name "Palm-size PCs".

The reduced size of the Palm-size PC means that certain sacrifices need to be made. For example, a typical Palm-size PC does not have fixed or removable disk drives such as hard disk, floppy disk, CD-ROM or DVD-ROM drives, with the persistent storage of a typical Palm-size PC comprising flash memory or volatile memory with a battery refresh. In addition, the amount of RAM in the typical Palm-size PC is also limited, resulting in specialized operating systems capable of running in the resource limited environment of the Palm-size PC. An example of such an operating system is the Windows CE™ operating system from Microsoft Corporation. Applications running on the Palm-size PC must also be capable of running in the resource limited environment described above. Applications running on the Palm-size PC are typically specialized versions of applications available on the bigger siblings of the Palm-size PC, such as calendar programs, personal information managers, calculators and the like.

Display size, resolution and color capability are other aspects that are affected by the reduced size of the Palm-size PC. The typical display of a standard PC has a diagonal length of between 14" and 21", a resolution ranging from 640×480 pixels to over 1280×1024 pixels, and is capable of displaying over sixteen million colors. In contrast, the typical Palm-size PC has a liquid crystal diode (LCD) display with a diagonal length of between 3.4" and 3.9", a resolution of 240×320 pixels, and is capable of a displaying four gray scale levels.

Designers have found that in the reduced size environment of a Palm-size PC, a portrait mode display is preferable to landscape mode. A portrait mode display is one that is taller than it is wide, i.e. the screen is 240×320 pixels. However, portrait LCDs typically are not as bright as landscape LCDs, and in addition, portrait LCDs typically exhibit an undesirable flicker.

Two solutions to the above-described flicker and brightness problems have been implemented in previous systems. The first solution uses what is known in the art as a dual-scan portrait LCD. Dual-scan LCDs are brighter and are able to provide a display that is typically flicker free. In addition the dual-scan LCD has the advantage that the display device interface used by a portrait mode application can avoid display driver overhead by writing directly to the dual-scan portrait LCD, since the display buffer and the display device orientation are the same. A significant disadvantage to the dual-scan LCD is that it costs approximately twice as much as a standard landscape LCD.

The second solution is to provide the Palm-size PC with a landscape LCD that has been physically rotated ninety degrees. In this solution, the system must maintain an intermediate screen buffer of pixels that must be rotated ninety degrees prior to insertion in the display buffer, thereby providing a portrait mode emulation using a landscape LCD. The advantage of this solution is that an acceptable display quality can be achieved with a lower cost of goods. A disadvantage with this solution is that direct screen writes to the display buffer are not possible, because the physical orientation of the screen does not match the orientation of the display buffer. This results in increased demands on the CPU and memory in a system with limited resources.

Previous systems have used various mechanisms to rotate image data in the screen buffer. In one system, the pixels are rotated one by one. In this system, the bits representing the color or gray scale level for an individual pixel in the screen buffer are extracted from the original memory location in the screen buffer and placed into a temporary byte. A memory location in the display buffer in which to place the pixel is then determined. The new location will reflect the ninety degree rotation. The rotated pixel value is written to image data comprising the display buffer by setting the appropriate bits in the new memory location with the bits from the temporary byte. In a second system, a table lookup scheme, as is known in the art, is used to rotate the screen.

A major disadvantage with both systems is that each pixel value in the screen buffer is converted to a byte value before it is moved from the internal screen buffer into the proper location in the display buffer. This is due to the fact that to implement the methods described above, various operations such as shifting and bit masking must be performed on a single pixel value. The smallest unit that most computers, including Palm-size PCs, can operate on is a byte. As a result, multiple CPU cycles are used to rotate each pixel using the mechanisms in the above-described systems. This results in increased demand for CPU and power resources in a machine that typically has limited resources.

Therefore, there is a need for a more efficient system to perform a ninety-degree rotation of image data. There is a need for such a system which consumes less CPU and power resources to perform such rotations.

SUMMARY

Rotation of image data comprising a screen buffer by ninety degrees is accomplished by dividing an area within the image data into a plurality of square pixel regions, rotating each of the squares, and writing the squares to a rotated image data buffer. The rotated image data buffer may comprise a display buffer. The system includes a graphics device driver that implements the rotation and maintains the display buffer. One version of the computerized system includes an operating system providing a graphics interface library, and a graphics interface buffer maintained by the graphics interface library. In this system, the graphics interface buffer contains the image data prior to rotation.

The method used to rotate the area divides the area into a square region of pixels, where each pixel has a number of bits specifying a color or gray scale level. The size of a side of the square region is determined by the word size of the computer and the number of bits specifying the color. For each row in the square area, one or more bytes representing the row are expanded by multiplying by an expansion constant determined by the word size and the number of bits specifying the color. Extraneous bits are removed by performing a logical AND of the word with a filter constant determined by the number of bits specifying the color. Finally, the word is left shifted by a number of places determined by the index of the row in the square and the number of bits specifying the color. The result is placed in one of a plurality of expansion rows. A logical OR of the plurality of expansion rows produces a rotated square region of pixels. This rotated square region is then translated along an X and Y-axis and placed into a rotated image data buffer. One aspect of the invention is that the image data buffer may comprise a display buffer used to refresh an LCD display.

The CPU operates on an entire row of pixels, not a pixel at a time. Individual pixels need not be converted to byte values. This results in improved efficiency in performing the screen rotation. Because of the improved efficiency, there is less demand for CPU cycles and power, allowing the Palm-size PC to operate longer on a given set of batteries.

BRIEF DESCRIPTION OF THE DRAWINGS

FIG. 5 is a sample-of a pixel group within an image data buffer prior to being rotated ninety degrees;

FIG. 6 is a sample of a pixel group within an image data buffer after being rotated ninety degrees.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, a method of rotating image data ninety degrees is described. Finally, in the fourth section, a conclusion of the detailed description is provided.

Hardware and Operating Environment

Figure 1:
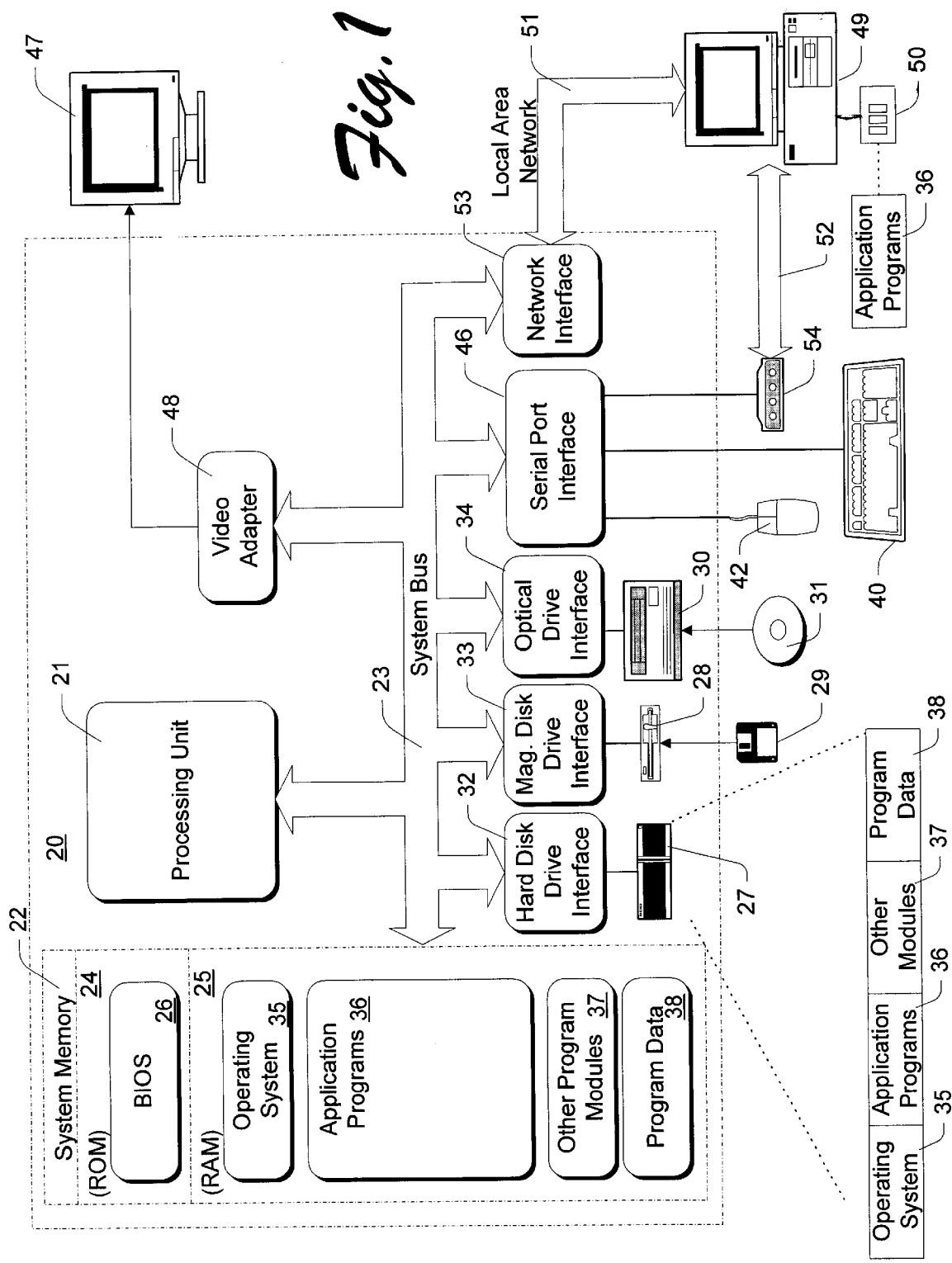
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
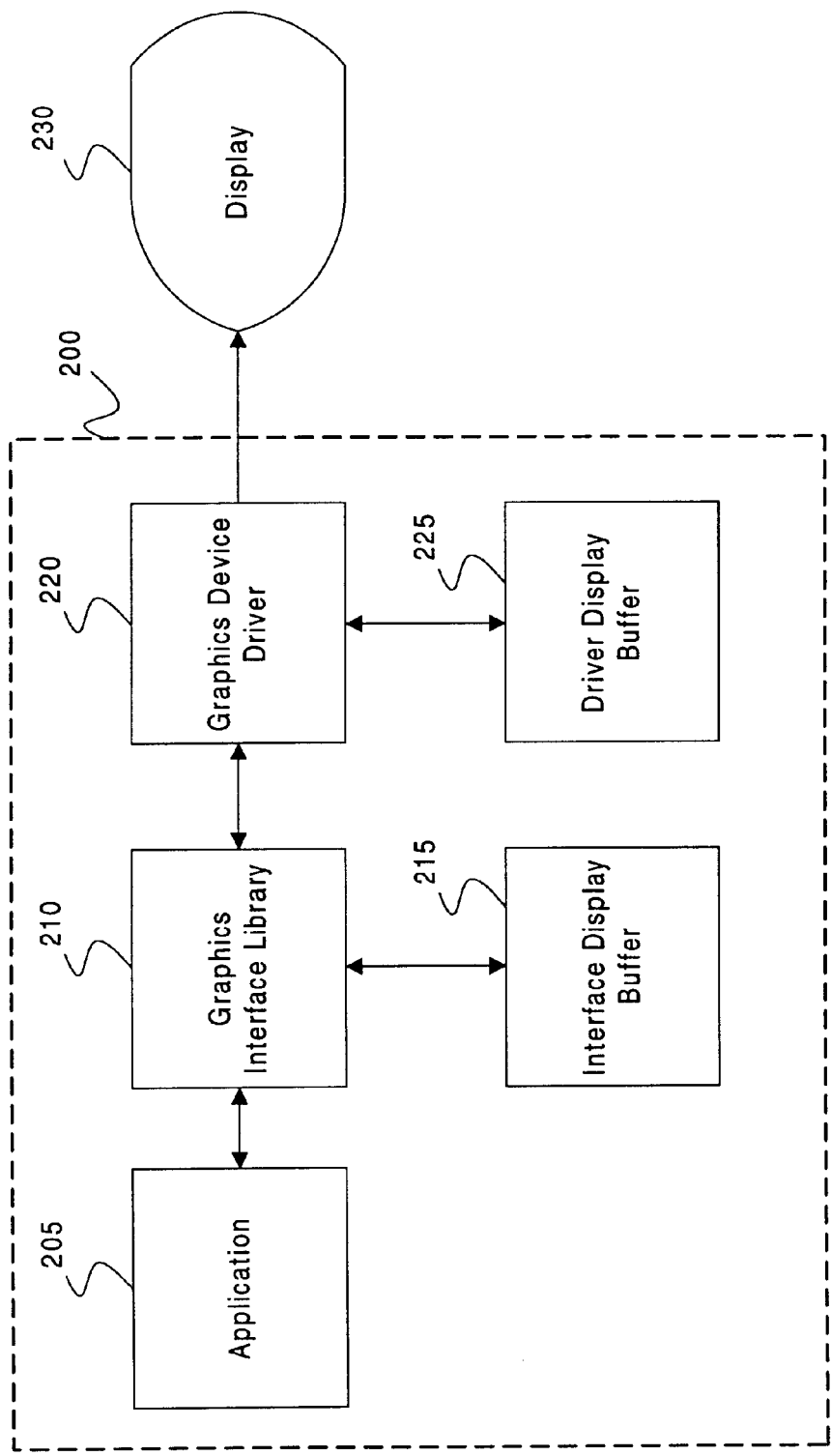
FIG. 2 is a diagram showing the major components of a software system of one embodiment of the invention.

FIG. 2 presents a system level overview of an embodiment of the invention. Included in the system are operating system 200, application 205, graphics interface 210, device driver 220, and display 230. Operating system 200 comprises a set of software modules designed to control and manage the resources of a computer system. In one embodiment of the invention, operating system 200 is the Windows CE operating system from Microsoft Corporation.

Application 205 is a software application running under operating system 200 which, as one aspect of its operation, provides output to be displayed on display 230. Examples of applications include word processors, spreadsheet calculators, personal information managers, and e-mail programs.

Graphics interface library 210 is a library of functions that is typically provided by or with operating system 200 that provide for displaying graphical objects on a display. The functions implemented by graphics interface library 210 include functions that display objects such as polygons, lines and text. Graphics interface library 210 also includes functions that control the attributes of the graphical objects such as size, color, texture, position, and orientation. In one embodiment of the invention, graphics interface library 210 is a Graphics Device Interface (GDI) driver supporting the Graphics Device Interface from Microsoft Corporation.

Interface display buffer 215 is a memory buffer holding image data comprising the internal representation of an output display buffer. The contents of the buffer are the pixel values that result from application calls to graphics interface library 210 functions. In one embodiment of the invention, interface display buffer 215 is a GDI display buffer.

Display driver 220 is a software module known in the art as a device driver. Display driver 220 comprises software routines that interface with a hardware controller (not shown) that controls display 230. The software routines in display driver 220 are typically written for a particular type of hardware controller and display 230. This is because different hardware manufacturers define different interfaces for their hardware, which results in specialized software requirements.

Display buffer 225 is a memory buffer containing image data for the pixels actually displayed on display 230. The hardware controller for the display reads the pixel values from this buffer and uses them to cause display 230 to illuminate the appropriate pixels on the display at the proper color or gray scale level.

Display 230 is a hardware component that shows the output produced by application 205. In one embodiment of the invention, display 230 is a landscape Liquid Crystal Display (LCD) having a screen resolution of 240×320 pixels, with each pixel having a two bit gray scale level associated with it. However, the invention is not so limited, and those skilled in the art will recognize that other display types, display resolutions, and pixel bit widths are possible and within the scope of the invention.

Figure 3:
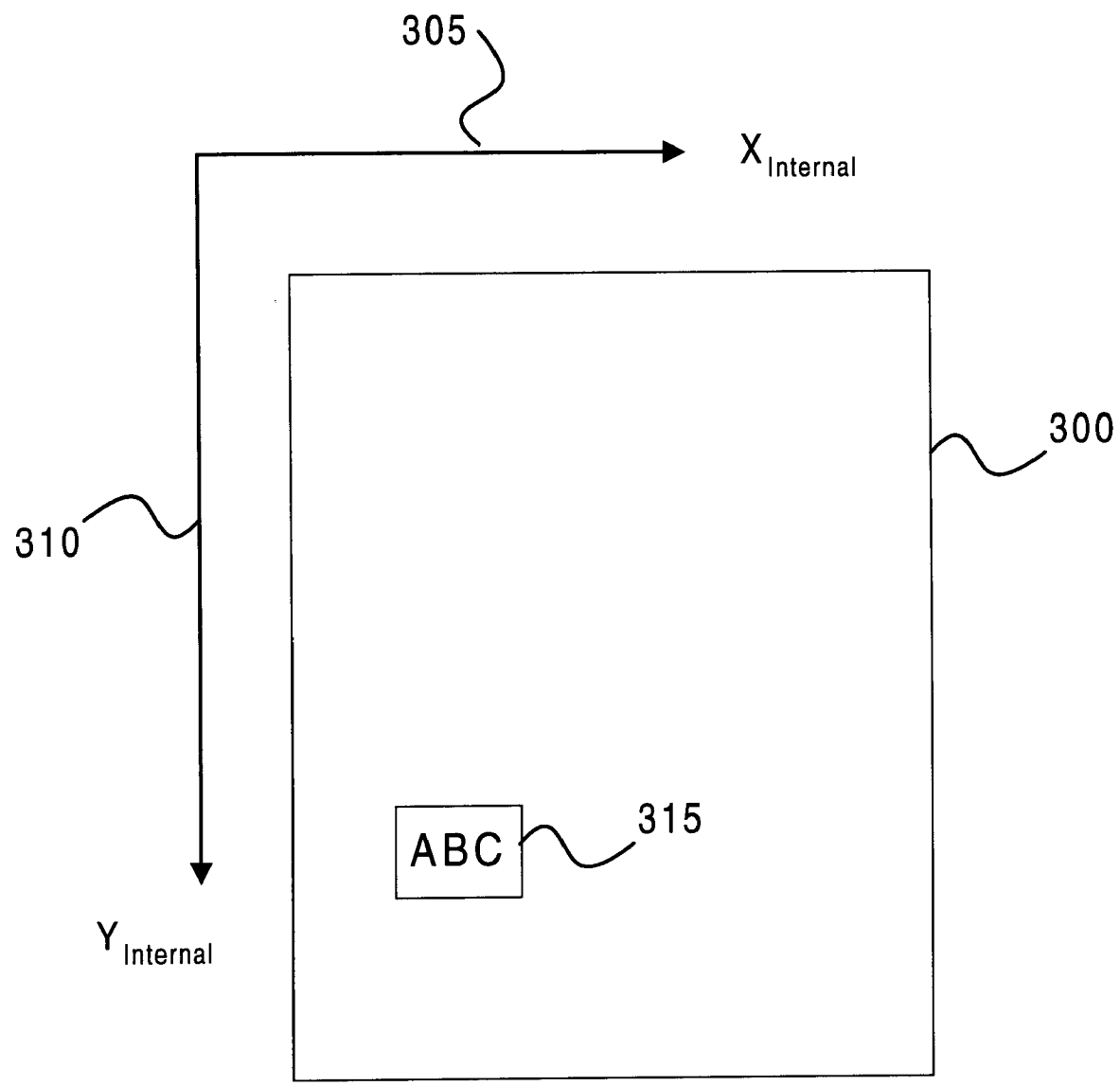
FIG. 3 is a representation of an image data buffer prior to being rotated ninety degrees.
Figure 4:
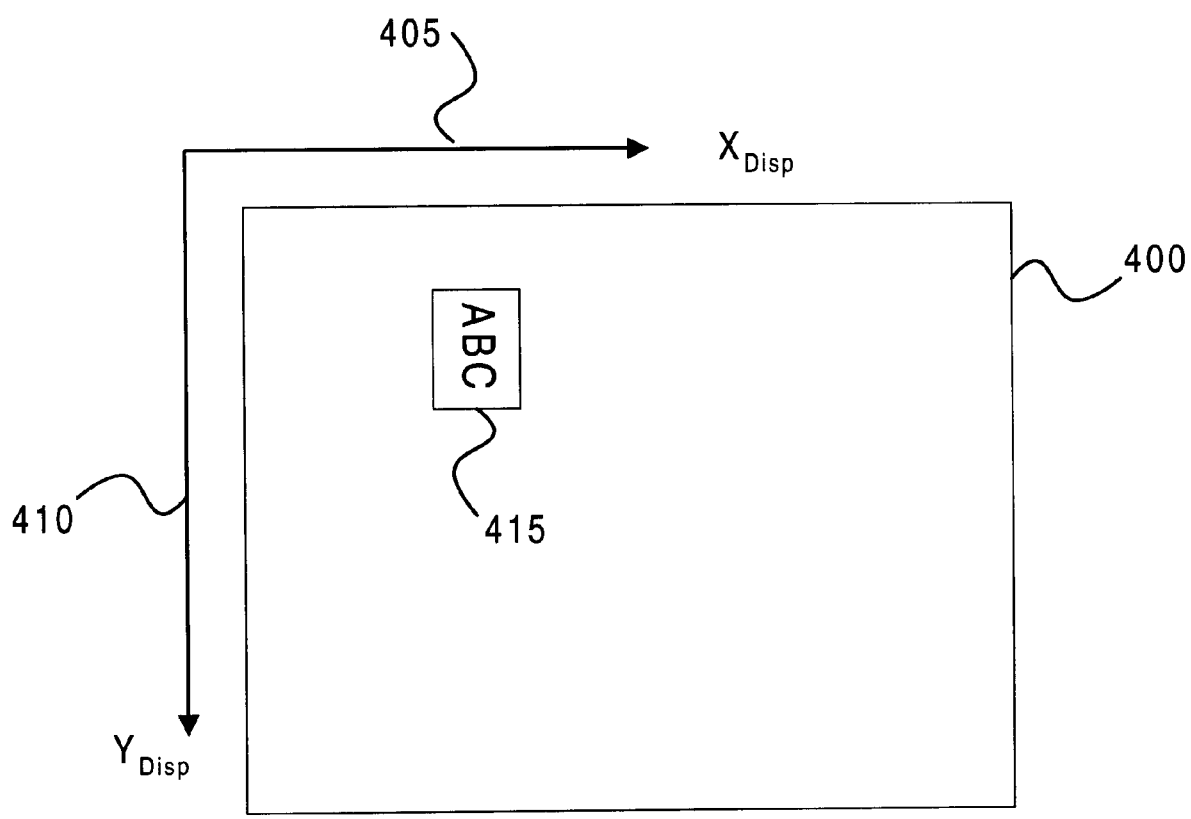
FIG. 4 is a representation of an image data buffer after being rotated ninety degrees.

In FIGS. 3 and 4, buffers containing image data before and after rotation are presented. FIG. 3 shows a representation of image data for a portrait mode screen 300 maintained in the interface display buffer 215 (FIG. 2). Pixel values within the image buffer for screen 300 are located by specifying coordinates along X axis 305 and Y axis 310. In this example, text area 315 represents an area of the screen that has been modified and must be rotated in order to be displayed properly.

FIG. 4 shows a representation of image data for a screen after it has been rotated according to the method described below. Landscape Screen 400 is a graphical representation of a landscape mode LCD screen that has been physically rotated ninety degrees for use in a Palm-size PC. Like screen 300, pixels in screen 400 are located by specifying X values along X axis 405 and Y values along Y axis 410. Text area 415 is the result of rotating the image data for screen area 315 in the interface display buffer 215 and placing the rotated result in display buffer 225.

In operation, the system works as follows. Application 205 desires to update the display on the Palm-size PC. Application 205 calls functions within the graphics interface library 210 that cause a portion of interface display buffer 215 to be updated to reflect the desired changes. Graphics interface library 210 then calls routines in graphics device driver 220 that update display 230. Graphics device driver 220 reads the values from the modified area in graphics interface buffer 215, applies the method described below to rotate the area and updates display buffer 225. Graphics device driver 220 then reads the image data values from display buffer 225 and causes the modified image to appear on display 230.

Method for Rotating Image Data

The previous section presented a system level description of an embodiment of the invention. In this section, a method within an embodiment of the invention will be described with reference to a flowchart describing tasks to be performed by computer programs implementing the method using computer-executable instructions. The computerized method is desirably realized at least in part as one or more programs running on a computer—that is, as a program executed from a computer-readable medium such as a memory by a processor of a computer. The programs are desirably storable on a computer-readable medium such as a floppy disk, CD-ROM, or Compact Flash (CF) card for distribution, installation and execution on another (suitably equipped) computer. The programs may also be stored on one computer system and transferred to another computer system via a network connecting the two systems, thus at least temporarily existing on a carrier wave or some other form of transmission.

Figure 7:
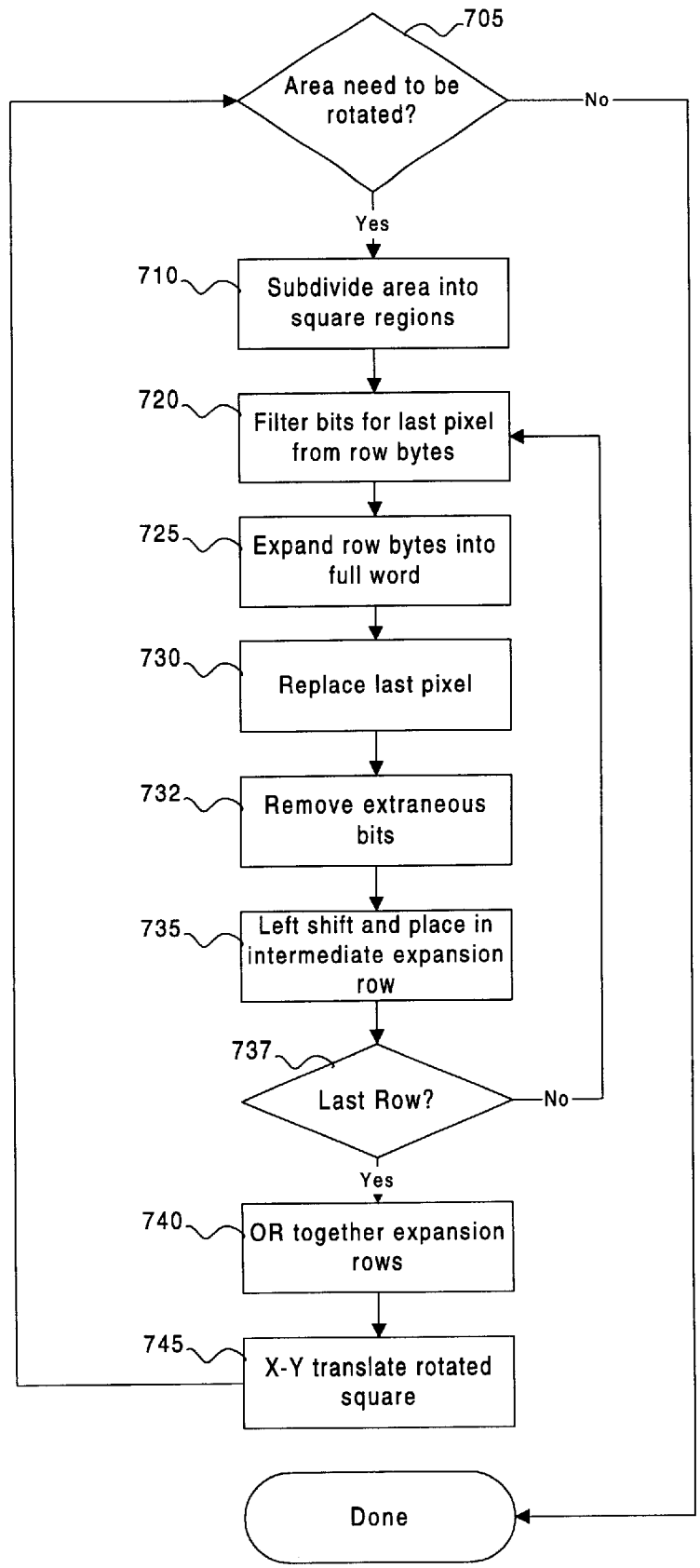
FIG. 7 is a flowchart illustrating a method according to one embodiment of the invention.

In FIG. 7, a flowchart is shown that illustrates a method for rotating image data according to an embodiment of the invention. The method begins at block 705, where a check is made to determine if image data for an area of the screen is to be rotated. In one embodiment of the invention, this determination is made based on whether or not there exists a "dirty" area in the internal display buffer 215. A dirty area is one that has been modified by an application 205, but the results of the modification have not yet been displayed. In an alternative embodiment of the invention, the image data for an entire screen, whether modified or not, is rotated.

The method then proceeds to block 710, where the area is divided into square areas of pixels. The size of a square is determined by the formula below:

$$S=(W/B)^{1/2}$$

where:
S is the resulting number of pixels in one side of the square;
W is the word size, in bits, of the particular CPU implementing the method; and
B is the number of bits used to represent a color or gray scale level of a pixel.

It is desirable that W be evenly dividable by B, and that W and B have values such that the resultant S is an integer value. When this is the case, the square area of pixels fits into one machine word, and rows of the square fit within even byte boundaries. One embodiment of the invention runs on CPUs having a 32 bit word size and uses 2 bits to indicate color or gray scale level, resulting in a square area 4×4 pixels in size. In an alternative embodiment of the invention, the CPU word size is 64 bits and 4 bits are used to represent color, resulting in a square area 4×4 pixels in size. In a further embodiment of the invention, the word size is also 64 bits, however 1 bit is used to represent color. In this embodiment, a square area 8×8 pixels in size is used. In yet another embodiment of the invention, the CPU has 16 bit words, and 4 bits are used for color, resulting in a 2×2 pixel area. Those of ordinary skill in the art will recognize that other combinations of S, W and B are possible and within the scope of the invention.

The method then proceeds to block 720, which is the top of a loop that is executed for each row R in the square area. Each row represents a portion of a scan-line in the pixel buffer. In one embodiment of the invention, a row R fits within a single 8-bit byte, however the invention is not so limited. In an alternative embodiment of the invention, a row R may take up a plurality of bytes. For example, in a system with a 64 bit word size where 4 bits are used to represent color or gray scale, a row would fit in 2 bytes. In this block, the method prepares the row to be expanded by masking the low order bits for the last pixel in the row. This is done to prevent carry bits or other bits from being propagated into the expansion during subsequent arithmetic shifts performed on the expanded value.

Next, at block 725, one or more bytes comprising a value representing the color or gray scale level for the pixels in the row are expanded into a full word by multiplying the row value by an expansion constant. The expansion constant is determined based on the word size W and bits per pixel B. The value, in effect, shifts the bits representing each pixel by individual amounts depending on the pixels position in the row. In one embodiment of the invention, where the CPU word size is 32 bits and 2 bits per pixel are used to represent the color or gray scale value, the expansion constant is the hexadecimal value 0x41041 (a leading "0x" is the C/C++ programming language standard for specifying hexadecimal, as opposed to decimal values). In general, the mask representing the expansion constant can be determined by performing an algorithm shown by the following C/C++ code fragment:

```
WORD Mask;
int i;
Mask=0;
for(i=0; i<S; i++){
    Mask=Mask<<M|0x1;
}
```

The value for M in the above code fragment is determined from the formula:

$$M=(S-1)*B$$

where S and B have the values described above in reference to block 710. The end result of the algorithm is to produce a value in which bit 0 is the least significant bit and where bits 0, M, 2*M, 3*M, 4*M etc. are 1, and all other bits are 0.

At block 730, the low-order bits that were removed at block 720 are replaced by OR'ing the result from block 725 with the original one or more bytes forming the value for the row prior to the filtering performed at block 720.

At block 732, extraneous bits are removed from the results from block 730 by performing a logical AND using a filter constant having a value determined according the number of bits per pixel B, and the number of pixels in a row S. In one embodiment of the invention, the mask value is hexadecimal 0x03030303. In general, the algorithm used to generate the mask is shown by the following C/C++ code fragment:

```
WORD Mask;
WORD tempMask;
int i;
tempMask=0;
for(i=0; i<S; i++){
```

```
    tempMask=tempMask<<1|0x1;
}
Mask=0;
for(i=0; i<S; i++){
    Mask=Mask<<(S*B)|tempMask;
}
```
where S and B have the values described above in reference to block 710.

The method then proceeds to block 735, which left shifts the results from block 732 by an amount that is determined by the formula:

$$L=(S-1-R)*B$$

where:
  L is the number of bits to shift left;
  S is the number of pixels in one side of the square from block 710 above;
  R is index of the current row, with the first row having an index of 0; and
  B is the number of bits per pixel used to represent color or gray scale level.

The shifted value is then placed in intermediate expansion row $E_R$. The method then proceeds to block 737, which determines if any rows are remaining in the square that require processing in the above manner. If there are remaining rows to be expanded, the method proceeds to block 720.

After all rows have been expanded, the method proceeds to block 740, where the intermediate expansion rows are logically OR'ed together to produce a rotated square. At block 745, the rotated square is translated into the appropriate position in the rotated screen buffer. In one embodiment of the invention, the translation is accomplished by applying x and y displacements determined by the following formulas:

$$X\text{display}=H\text{internal}-Y\text{internal}$$

$$Y\text{display}=W\text{internal}-X\text{internal}$$

where:
  Xdisplay is the X axis value for the position of the rotated square in the display buffer;
  Hinternal is the height of the internal screen buffer;
  Yinternal is the Y axis value of the un-rotated square in the internal screen buffer;
  Ydisplay is the Y axis value for the position of the rotated square in the display buffer;
  Winternal is the width of the internal screen buffer; and
  Xinternal is the X axis value of the un-rotated square in the internal screen buffer.

Those of ordinary skill in the art will appreciate that the translation above is dependant on the coordinate systems used by the dispaly and the internal buffer for a particular operating system. Other translations formulas can be derived based on the specific coordinate systems defined by a particular display buffer and internal buffer. After translating the square's position, the method than proceeds to block 705 to determine if any un-rotated square areas remain.

An example of the application of the method in one embodiment of the invention is shown in FIGS. 5 and 6. FIG 5 shows a square region of pixel color values in the internet screen buffer of a machine with a 32-bit word size and where 2 bits are used to represent color or gray scale. The individual pixel values are labeled for convenience with the letters A–R, with the letters O and Q removed to improve readability. The table below shows the resulting intermediate values at various points in the method described above. In the table, a letter represents the two bit pixel color or gray scale value, and the numeral 0 represent two bits having a zero value.

TABLE 1

| Row Index (R) | Row Row Byte | Mask Last Pixel | Expanded Value with Last Pixel Added | Remove Extraneous Bits | Left Shifted Intermediate Result |
|---|---|---|---|---|---|
| 0 | ABCD | ABC0 | 000ABCABCABCABCD | 000A000B000C000D | A000B000C000D000 |
| 1 | BFGH | EFG0 | 000EFGEFGEFGEFGH | 000E000F000G000H | 0E000F000G000H00 |
| 2 | IJKL | IJK0 | 000IJKIJKIJKIJKL | 000I000J000K000L | 00I000J000K000L0 |
| 3 | MNPR | MNP0 | 000MNPNNPMNPMNPR | 000M000N000P000R | 000M000N000P000R |

The values in the intermediate results are then logically OR'ed to produce the 32-bit value AEIMBFJNCGKPDHLR, which represents rotated square of pixels as shown in FIG. 6. This square region of pixels is then translated as described above into the display buffer 230.

Conclusion

A method for rotating image data ninety degrees has been disclosed. In particular, systems and methods for dividing an image data buffer containing pixels into square areas to be rotated has been described. Although specific embodiments have been illustrated and described herein, it will be appreciated by those of ordinary skill in the art that any arrangement which is calculated to achieve the same purpose may be substituted for the specific embodiments shown. For example, the systems and methods described herein could be applied graphics rendering programs to provide a mechanism to rotate graphical images maintained by the application. In addition, the system and methods described herein can be applied to computer systems other than Palm-size PCs, for example laptop and desktop PCs. This application is intended to cover any adaptations or variations of the present invention. Therefore, it is manifestly intended that this invention be limited only by the following claims and equivalents thereof.

I claim:

1. A method for rotating an area within image data, the method comprising:
  dividing the area into square regions of pixels based on a word size and a bits per pixel size, said square having a plurality of rows;
  rotating each row of each square region by expanding one or more bytes containing a plurality of pixel values for the row into an expanded row word;
  combining each expanded row word to provide a rotated square region; and translating the rotated square region to provide a rotated area of image data.

2. A method for a computer having a word size to rotate an area within image data, the method comprising:

dividing the area into a square region of pixels, said pixels having a number of bits specifying a color, said square region having a plurality of rows, a size of a side of said square region being determined by the word size of the computer and the number of bits specifying the color;

for each row in the square area executing the tasks of:

expanding one or more bytes representing the row into a word by multiplying the one or more bytes by an expansion constant determined by the word size and the number of bits specifying the color, masking bits from the word by performing a logical AND of the word with a filter constant determined by the number of bits specifying the color, and left shifting the word by a number of places determined by the index of the row in the square and the number of bits specifying color and placing the result into one of a plurality of expansion rows;

performing a logical OR of the plurality of expansion rows to produce a rotated square region of pixels; and performing a translation along an X and Y axis to place the rotated square region into a rotated image buffer.

3. The method of claim 2, wherein the color is a gray scale level.

4. The method of claim 2, wherein the number of bits specifying the color is two (2), the word size is thirty two (32) bits, the size of a side of the square region is four (4) pixels, the expansion constant is a hexadecimal value 0x41041, and the filter constant is a hexadecimal value 0x03030303.

5. The method of claim 2, wherein the number of bits specifying the color is one (1), the word size is sixty four (64) bits, and the size of a side of the square region is eight (8) pixels.

6. The method of claim 2, wherein the number of bits specifying the color is four (4), the word size is sixteen (16) bits, and the size of a side of the square region is two (2) pixels.

7. The method of claim 2, wherein the number of bits specifying the color is four (4), the word size is sixty four (64) bits, and the size of a side of the square region is four (4) pixels.

8. The method of claim 2, wherein the tasks performed for each row further comprises:

setting a group of bits representing a color of a last pixel in the row to zero before expanding the row; and resetting a group of bits representing the color of the last pixel in the row to an original value after expanding the row.

9. A computer-readable medium having computer-executable instructions for a computer to perform a method comprising:

dividing an area of image data into square regions of pixels based on a word size and a bits per pixel size, said square having a plurality of rows;

rotating each row of each square region by expanding one or more bytes containing a plurality of pixel values into an expanded row word having one or more bytes;

combining each expanded row word to provided a rotated square region; and translating the rotated square region to provide a rotated area of image data.

10. A computer-readable medium having computer-executable instructions for a computer having a word size to perform a method for rotating an area of image data, the method comprising:

dividing the area into a square region of pixels, said pixels having a number of bits specifying a color, said square having a plurality of rows, a size of a side of said square region being determined by the word size of the computer and the number of bits specifying the color;

for each row in the square area executing the tasks of:

expanding one or more bytes representing a row into a word by multiplying the value represented by the one or more bytes by an expansion constant determined by the word size and the number of bits specifying the color, masking bits in the word by performing a logical AND of the word with a filter constant determined by the number of bits specifying the color, and left shifting the word by a number of places determined by the index of the row in the square and the number of bits specifying color and placing the result into one of a plurality of expansion rows;

performing a logical OR of the plurality of expansion rows to produce a rotated square region of pixels; and performing a translation along an X and Y axis to place the rotated square region into a rotated image buffer.

11. The computer readable medium of claim 10, wherein the color is a gray scale level.

12. The computer readable medium of claim 10, wherein the number of bits specifying the color is two (2), the word size is thirty two (32) bits, the size of a side of the square region is four (4) pixels, the expansion constant is a hexadecimal value 0x41041, and the filter constant is a hexadecimal value 0x03030303.

13. The computer readable medium of claim 10, wherein the number of bits specifying the color is one (1), the word size is sixty four (64) bits, and the size of a side of the square region is eight (8) pixels.

14. The computer readable medium of claim 10, wherein the number of bits specifying the color is four (4), the word size is sixteen (16) bits, and the size of a side of the square region is two (2) pixels.

15. The computer readable medium of claim 10, wherein the number of bits specifying the color is four (4), the word size is sixty four (64) bits, and the size of a side of the square region is four (4) pixels.

16. The computer readable medium of claim 10, wherein the tasks performed for each row further comprises:

setting a group of bits representing a color of a last pixel in the row to zero before expanding the row; and resetting a group of bits representing the color of the last pixel in the row to an original value after expanding the row.

* * * * *

UNITED STATES PATENT AND TRADEMARK OFFICE
CERTIFICATE OF CORRECTION

PATENT NO. : 6,400,851 B1
DATED : June 4, 2002
INVENTOR(S) : Shih

It is certified that error appears in the above-identified patent and that said Letters Patent is hereby corrected as shown below:

Column 5,
Line 9, insert -- 20 -- between 'computer" and "may".

Column 9,
Line 65, replace "dependant" with -- dependent --.
Line 66, replace "dispaly" with -- display --.
Line 67, replace " translations" with -- translation --.

Column 10,
Line 3, replace "than" with -- then --.
Line 8, replace "internet" with -- internal --.

Signed and Sealed this

Twenty-first Day of January, 2003

JAMES E. ROGAN
*Director of the United States Patent and Trademark Office*